United States Patent
Yochai et al.

(10) Patent No.: US 9,003,112 B2
(45) Date of Patent: Apr. 7, 2015

(54) SYSTEM, METHOD AND A NON-TRANSITORY COMPUTER READABLE MEDIUM FOR READ THROTLING

(71) Applicants: Yechiel Yochai, Moshav Aviel (IL); Haim Bitner, Raanana (IL)

(72) Inventors: Yechiel Yochai, Moshav Aviel (IL); Haim Bitner, Raanana (IL)

(73) Assignee: Infinidat Ltd., Herzliya (IL)

( * ) Notice: Subject to any disclaimer, the term of this patent is extended or adjusted under 35 U.S.C. 154(b) by 161 days.

(21) Appl. No.: 13/915,642

(22) Filed: Jun. 12, 2013

(65) Prior Publication Data
US 2014/0372693 A1 Dec. 18, 2014

(51) Int. Cl.
*G06F 12/08* (2006.01)
(52) U.S. Cl.
CPC ................ *G06F 12/0866* (2013.01)
(58) Field of Classification Search
None
See application file for complete search history.

(56) References Cited

U.S. PATENT DOCUMENTS

| | | | | |
|---|---|---|---|---|
| 7,127,568 B2 * | 10/2006 | Watanabe et al. | ............ | 711/154 |
| 2006/0075191 A1 * | 4/2006 | Lolayekar et al. | ............ | 711/114 |
| 2009/0300283 A1 * | 12/2009 | Kudo | ............ | 711/114 |

* cited by examiner

*Primary Examiner* — Gary Portka
(74) *Attorney, Agent, or Firm* — Oren Reches

(57) ABSTRACT

A method for managing read requests, the method may include receiving from a requesting entity a read request for reading an information unit stored in a storage system; determining by a control entity of the storage system whether the information unit is cached in a cache memory of the storage system and whether at least a predetermined number of disk drives of the storage system are currently overloaded; introducing a delay to a response to the read request thereby increasing a time difference between a time of the receiving of the read request and a time of a provision of the information unit to the requesting entity, if it is determined that the information unit is not cached in the cache memory and that the at least predetermined number of disk drives of the storage system are currently overloaded; and providing the information unit to the requesting entity.

20 Claims, 5 Drawing Sheets

SYSTEM, METHOD AND A NON-TRANSITORY COMPUTER READABLE MEDIUM FOR READ THROTLING

BACKGROUND

In a storage system that utilizes an array of disk drives for storing data, data is generally evenly distributed across the disk drives, assuming the disk drives are identical in terms of performance. In the stable state all the disk drives are loaded with an equal number of requests. If some of the disk drives are working even slightly slower than the others, the response time of requests sent to the slow disk drives is substantially elevated. When the entire system works at its higher but still supportable levels of workload, even if one disk drive is working slightly slower than others, an increased response time for some of the I/O requests can be observed, which eventually leads to timeout of requests at the hosts that send the requests and waiting for responses.

Large read queue of requests waiting for a disk drive can also be the result of non-uniform distribution of requests across the disk drives. For example by placing newly created data on some of the disk drives. While these cases should be avoided in the data distribution algorithm, it cannot be totally prevented and even a small bias in the distribution can cause accumulation of requests on some of the read queues.

Read requests are accumulated on slower disk drives, causing delays in response time, when implementing uniform distribution of requests across disk drives.

There is a growing need to provide a system, method and a computer readable medium for reducing the effect of unevenly loaded disk drives.

SUMMARY

According to an embodiment of the invention a method may be provided and may include receiving from a requesting entity a read request for reading an information unit stored in a storage system; determining by a control entity of the storage system whether the information unit is cached in a cache memory of the storage system and whether at least a predetermined number of disk drives of the storage system are currently overloaded; introducing a delay to a response to the read request thereby increasing a time difference between a time of the receiving of the read request and a time of a provision of the information unit to the requesting entity, if it is determined that the information unit is not cached in the cache memory and that the at least predetermined number of disk drives of the storage system are currently overloaded; and providing the information unit to the requesting entity.

The method may include introducing the delay after the information unit was provided by a disk drive of the storage system.

The method may include introducing the delay before sending to a disk drive of the storage system a request to retrieve the information unit.

The method may include responding to a write request received by the storage system without introducing the delay.

The method may include responding to a read request without introducing the delay if it determined that the information unit is stored in the cache memory.

The method may include determining that a disk drive of the storage system is overloaded by comparing a number of pending read requests aimed to the disk drive to a read requests threshold.

The method may include determining the read requests threshold in response to an average number of actual or expected read requests per disk drive of the storage system.

The method further may include determining whether the response to the read request has not been provided by a disk drive within a desired response time and preventing from introducing the delay if it is determined that the read request has not been responded within the desired response time; wherein the desired response time is counted from the time of the receiving of the read request.

The method may include determining a length of the delay in response to an accumulation rate of read requests aimed to any overloaded disk drive.

The method may include determining a length of the delay so as to guarantee that a time difference between the time of the receiving of the read request and the time of a provision of the information unit to the requesting entity does not exceed a desired response time.

The method may include determining that the disk drive is overloaded by tracking a difference between a rate of dequeuing read requests from a read request queue of the disk drive and a rate of enqueueing of read requests at the read request queue of the disk drive.

The method may include introducing the delay to the response to the read request if the disk drive that stores the information unit is not overloaded and not introducing the delay if the information unit is stored in an overloaded disk drive.

According to an embodiment of the invention there may be provided a non-transitory computer readable medium that stores instructions to be executed by a computer for receiving from a requesting entity a read request for reading an information unit stored in the storage system; determining by a control entity of a storage system whether the information unit is cached in a cache memory of the storage system and whether at least predetermined number of disk drives of the storage system is currently overloaded; introducing a delay to a response to the read request thereby increasing a time difference between a time of the receiving of the read request and a time of a provision of the information unit to the application if it is determined that the information unit is not cached in the storage system and that the at least predetermined number of disk drives storage system is currently overloaded; and providing the information unit to the requesting entity.

The non-transitory computer readable medium may store instructions to be executed by a computer for introducing the delay after the information unit was provided by a disk drive of the storage system.

The non-transitory computer readable medium may store instructions to be executed by a computer for introducing the delay before sending to a disk drive of the storage system a request to retrieve the information unit.

The non-transitory computer readable medium may store instructions to be executed by a computer for responding to a write request received by the storage system without introducing the delay.

The non-transitory computer readable medium may store instructions to be executed by a computer for responding to a read request without introducing the delay if it determined that the information unit is stored in the cache memory.

The non-transitory computer readable medium may store instructions to be executed by a computer for determining that a disk drive of the storage system is overloaded by comparing a number of pending read requests aimed to the disk drive to a read requests threshold.

The non-transitory computer readable medium may store instructions to be executed by a computer for determining the read requests threshold in response to an average number of actual or expected read requests per disk drive of the storage system.

The method further may include determining whether the response to the read request has not been provided by a disk drive within a desired response time and preventing from introducing the delay if it is determined that the read request has not been responded within the desired response time; wherein the desired response time is counted from the time of the receiving of the read request.

The non-transitory computer readable medium may store instructions to be executed by a computer for determining a length of the delay in response to an accumulation rate of read requests aimed to any overloaded disk drive.

The non-transitory computer readable medium may store instructions to be executed by a computer for determining a length of the delay so as to guarantee that a time difference between the time of the receiving of the read request and the time of a provision of the information unit to the requesting entity does not exceed a desired response time.

The non-transitory computer readable medium may store instructions to be executed by a computer for determining that the disk drive is overloaded by tracking a difference between a rate of dequeuing read requests from a read request queue of the disk drive and a rate of enqueueing of read requests at the read request queue of the disk drive.

The non-transitory computer readable medium may store instructions to be executed by a computer for introducing the delay to the response to the read request if the disk drive that stores the information unit is not overloaded and not introducing the delay if the information unit is stored in an overloaded disk drive.

According to an embodiment of the invention there may be provide a system that may include: multiple disk drives; a cache memory; and a control entity that is arranged to: receive from a requesting entity a read request for reading an information unit stored in the storage system; determine whether the information unit is cached in the cache memory of the storage system and whether at least a predetermined number of disk drives of the multiple disk drives is currently overloaded; introduce a delay to a response to the read request thereby increasing a time difference between a time of the receiving of the read request and a time of a provision of the information unit to the application if it is determined that the information unit is not cached in the storage system and that the at least the predetermined number of disk drives of the storage system is currently overloaded; and control a provision of the information unit to the requesting entity.

The system may be arranged to introduce the delay after the information unit was provided by a disk drive of the storage system.

The system may be arranged to introduce the delay before sending to a disk drive of the storage system a request to retrieve the information unit.

The system may be arranged to respond to a write request received by the storage system without introduce the delay.

The system may be arranged to respond to a read request without introduce the delay if it determined that the information unit is stored in the cache memory.

The system may be arranged to determine that a disk drive of the storage system is overloaded by comparing a number of pending read requests aimed to the disk drive to a read requests threshold.

The system may be arranged to determine the read requests threshold in response to an average number of actual or expected read requests per disk drive of the storage system.

The method further may include determine whether the response to the read request has not been provided by a disk drive within a desired response time and preventing from introduce the delay if it is determined that the read request has not been responded within the desired response time; wherein the desired response time is counted from the time of the receiving of the read request.

The system may be arranged to determine a length of the delay in response to an accumulation rate of read requests aimed to any overloaded disk drive.

The system may be arranged to determine a length of the delay so as to guarantee that a time difference between the time of the receiving of the read request and the time of a provision of the information unit to the requesting entity does not exceed a desired response time.

The system may be arranged to determine that the disk drive is overloaded by tracking a difference between a rate of dequeuing read requests from a read request queue of the disk drive and a rate of enqueueing of read requests at the read request queue of the disk drive.

The system may be arranged to introduce the delay to the response to the read request if the disk drive that stores the information unit is not overloaded and not introduce the delay if the information unit is stored in an overloaded disk drive.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
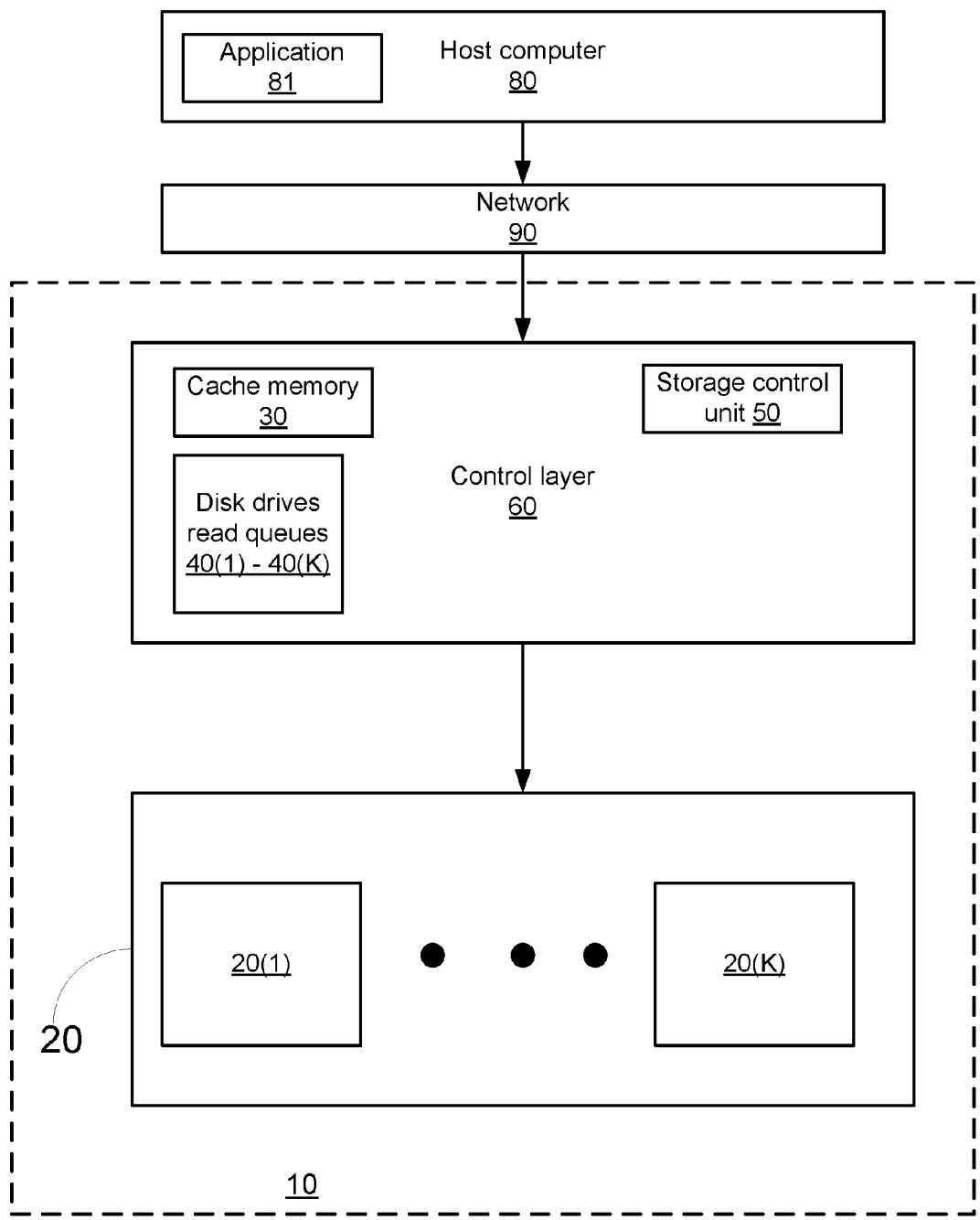
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to an embodiment of the invention there may be provided a storage system, a method that are arranged to increasing the response time to a read request When at least a predetermined number of disk drives are overloaded, as reflected by their read queue size, the response time for I/O requests (such as read requests for an information unit that is stored in a disk drive of the storage system) may be deliberately increased by the storage system, causing less requests to enter the storage system, and eventually the load on the overloaded disk drives is balanced. A disk drive may seem to be overloaded if the actual or expected load on the disk drive exceeds a desirable load threshold.

Thus, when an unbalanced workload is detected (by detecting an overload of at least a predetermined number of disk drives), the average response time for requests in the system is artificially increased.

According to an embodiment of the invention, only response times of read requests that require reading from a disk drive is being increased without affecting response time of (a) read requests that are served from the cache memory of the storage system, and (b) write requests that are generally saved in the cache memory before being acknowledged to an application hosted by a host computer.

Thus, an application (hosted by a host computer or by the storage system itself) that sends a read request to read an information unit that is cached in the cache memory (or performs a write operation) may not be subjected to the deliberate increase in a response time, while applications that send bursts of read requests that are served from one or more of the disk drives (part of these disk drives may be the overloaded ones—although this is not necessarily so) will experience a slowdown in responses.

Since generally an application has a limited buffer of waiting/uncompleted requests (requests that were sent from the application to the storage system and are waiting for response/acknowledgement), the incremented response time will cause an increase of the number of read requests waiting on the application side and eventually will slow down the rate the storage system receives read requests from these applications.

In an extreme situation, where an extensive number of applications send read requests that are served from the disk drive and/or in the hypothetic situation where applications do not have upper limitation on the number of waiting requests in their read queues, the number of total requests concurrently handled by the storage system will continuously increase until an upper limitation on the amount of currently handled requests is exceeded. In such situation the system will discard/ignore some of the incoming requests, causing the applications to retry the ignored requests, while in the meantime the overloaded disk's read queues will be alleviated.

Determining Unbalanced Workload Situation

The determination of one or more overloaded disk drive may include checking the read queues of pending read requests of one or more disk drives and identifying at least a predetermined number (for example one) disk drives with an overloaded read queue.

The predetermined number may be provided to the storage system (for example—by a system administrator), may be changed over time, may equal one, may exceed one and the like.

An overloaded disk drive's read queue can be detected when the number of pending requests in the drive's read queue exceeds a pending requests threshold.

The pending requests threshold can be defined as a function of the expected average of pending requests for that disk drive or as a function of the average expected pending requests for multiple disk drives.

The average can be calculated as the number of total requests currently handled in the storage system (or maximum requests that can be concurrently handled by the storage system or the average number of requests expected to be concurrently handled by the storage system) divided by the number of disk drives in the storage system.

For example, if the expected average of pending requests per read queue is thirty two, then if a specific drive's read queue counts twice the expected average, i.e., sixty four pending requests, it may indicate that there is an increased probability that either the drive is a slow drive or else the load distribution is not balanced.

Once a disk drive (or at least more than a predetermined number of disk drives) is found to have a read queue that exceeds the pending requests threshold, a more in-depth check may be carried out to detect whether the read requests are being increasingly accumulated on this drive's read queue over time (more read requests are added than served) or otherwise, the loaded read queue is just a temporal state.

Calculating the accumulation rate of a certain disk drive can be done by measuring the number of requests added to the read queue of the certain disk drive during a certain time window (or the average time between enqueueing of requests) and the number of responses generated by the certain disk drive during the certain time window (or the average time between responses).

A situation where the average of enqueued requests in a time window is greater than the average of generated responses indicates that requests are being increasingly accumulated on the read queue. If the read queues of at least the predetermined number of disk drives are increasingly accumulated the rate of incoming requests should be throttled. The ratio between the rate of enqueueing requests and the rate of serving requests indicates the rate of requests accumulation. The rate of requests accumulation and, additionally or alternatively, a number of read queues that seem to be accumulated may indicate the level of required throttling.

Read Throttling

After determining that at least a predetermined number (for example one or more) read queue is accumulating, the storage system artificially increases its average response time.

One way to increase the response time is to delay responses by enforcing a wait time on the responses, before being transferred to the application. Alternatively, a wait time can be enforced on the incoming requests before being handed over to the disk drive layer.

Delaying of responses may be applied only to read requests that are to be served from any of the disk drives or from some of the disk drives. Applying the delay should be avoided to read requests that are to be served from the cache as well as all write requests that are saved in the cache before being acknowledged.

According to an embodiment of the invention, the delaying of responses may be performed only for requests that have been served faster than a desired response time, so as not to affect requests that are already served slowly and a further slowdown may cause a timeout.

In this manner the variance in response time is reduced.

The desired response time may be an average response time, a tolerable response time, a guaranteed response time, etc. It is expected that in an unbalanced system most of the requests will be below the average response time, as a relatively small amount of responses are substantially delayed and makes most of the contribution to the average response time.

In the above description two factors influences the decision of which requests can undergo a delayed response: (i) delaying responses for read requests from the disk drives rather than requests served from the cache; (ii) delaying responses of requests that have been served faster than a threshold. If both are implemented, then the delaying may be performed on the response after the response is being provided by the disk drive layer (along with a timestamp of the request arrival so as to calculate the time duration of the request in the system). It is possible to adapt the first factor only, in which case, the delaying can be also performed after a "cache miss" event for a read request and the delay can be applied on the request rather than on the response.

The amount of delay introduced to the responses can be for example a function of a measured accumulation rate, number of overloaded disk drives and a combination thereof. The measured accumulation rate may be the difference or ratio between a rate of filling the read queue of a disk drive and a rate of dequeuing read requests that have been served.

The amount of delay introduced may take into account the desired response time, so that the response time of a certain request after introducing the delay would not be greater than the desired response time.

The steps taken for increasing the system response time may continue until less than the predetermined number of disk drives are overloaded. For example if the predetermined number equals one then the steps taken for increasing the response time may terminate once the single overloaded read queue is alleviated (e.g. when less requests are enqueued than served within a time window).

Before deciding to stop the throttling, a re-check for another overloaded drive's read queue may be handled and when there are less than the predetermined number of overloaded read queues (for example—no more overloaded disk drive's read queues), the throttling stops.

FIG. 1 illustrates a storage system 10, a host computer 80 and a network 90 according to an embodiment of the invention.

The storage system 10 includes a disk drive layer 20 that includes multiple disk drives 20(1)-20(K) and a control entity such as a control layer 60 that includes cache memory 30, disk drive read queues 40(1)-40(K) and a storage control unit 50.

The term control entity means any entity that includes at least one hardware component and controls various aspects of the storage system such controlling interface operations (including I/O operations) between components that are external to the storage system (such as host computers) host and the storage physical space. A control layer is an example of such a control entity. The reference to "layer" indicated that there may be a logical separation between the control entity and a so-called storage layer.

The functions of the control layer 60 can be fully or partly integrated with one or more host computers and/or storage devices and/or with one or more communication devices enabling communication between the hosts and the storage devices. The storage control layer and the storage devices can communicate with the host computers and within the storage system in accordance with any appropriate storage protocol.

The storage control unit 50 is arranged to:
A. Receive from a requesting entity such as host computer 80 or application 81 hosted by host computer 80, a read request for reading an information unit stored in the storage system.
B. Determine whether the information unit is cached in cache memory 30 of the storage system and whether at least predetermined number of disk drives of the storage system are overloaded.
C. Deliberately introducing a delay between a time of the receiving of the read request and a time of a provision of the information unit to the host computer if it is determined that the information unit is not cached in the storage system and that the at least predetermined number of disk drives of the storage system are overloaded.
D. Control a provision of the information unit to the requesting entity (e.g. host computer 80).
E. Determine whether there are at least predetermined number of overloaded disk drives and to initiate a process of introducing enforced delays.

Figure 2:
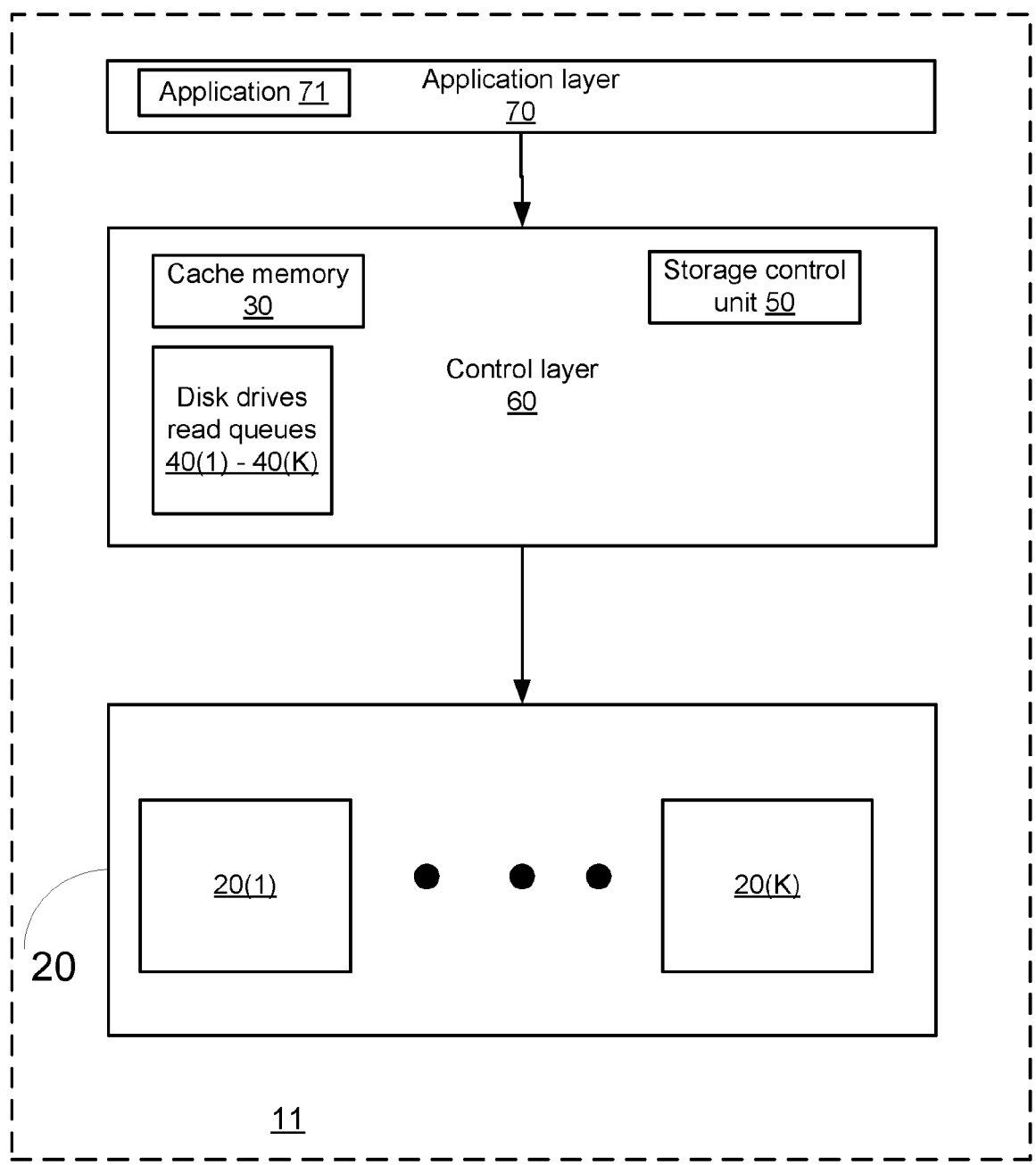
FIG. 2 illustrates a system according to an embodiment of the invention.

FIG. 2 illustrates a storage system 11, according to an embodiment of the invention.

Storage system 11 includes an application layer 70, multiple disk drives 20(1)-20(K) and a control layer 60 that includes cache memory 30, disk drive read queues 40(1)-40 (K) and a storage control unit 50.

The storage control unit 50 is arranged to:
A. Receive from a requesting entity such as an application 71 executed by the application layer 70, a read request for reading an information unit stored in the storage system.
B. Determine whether the information unit is cached in a cache module of the storage system and whether at least a predetermined number of disk drives of the storage system are overloaded.
C. Introduce a delay between a time of the receiving of the read request and a time of a provision of the information unit to the application if it is determined that the information unit is not cached in the storage system and that at least a predetermined number of disk drives of the storage system are overloaded; and D. Control a provision of the information unit to the requesting entity (application 71 executed by the application layer 70).

It is noted that the storage system 11 may be coupled via network to one or more host computers (not shown).

Figure 3:
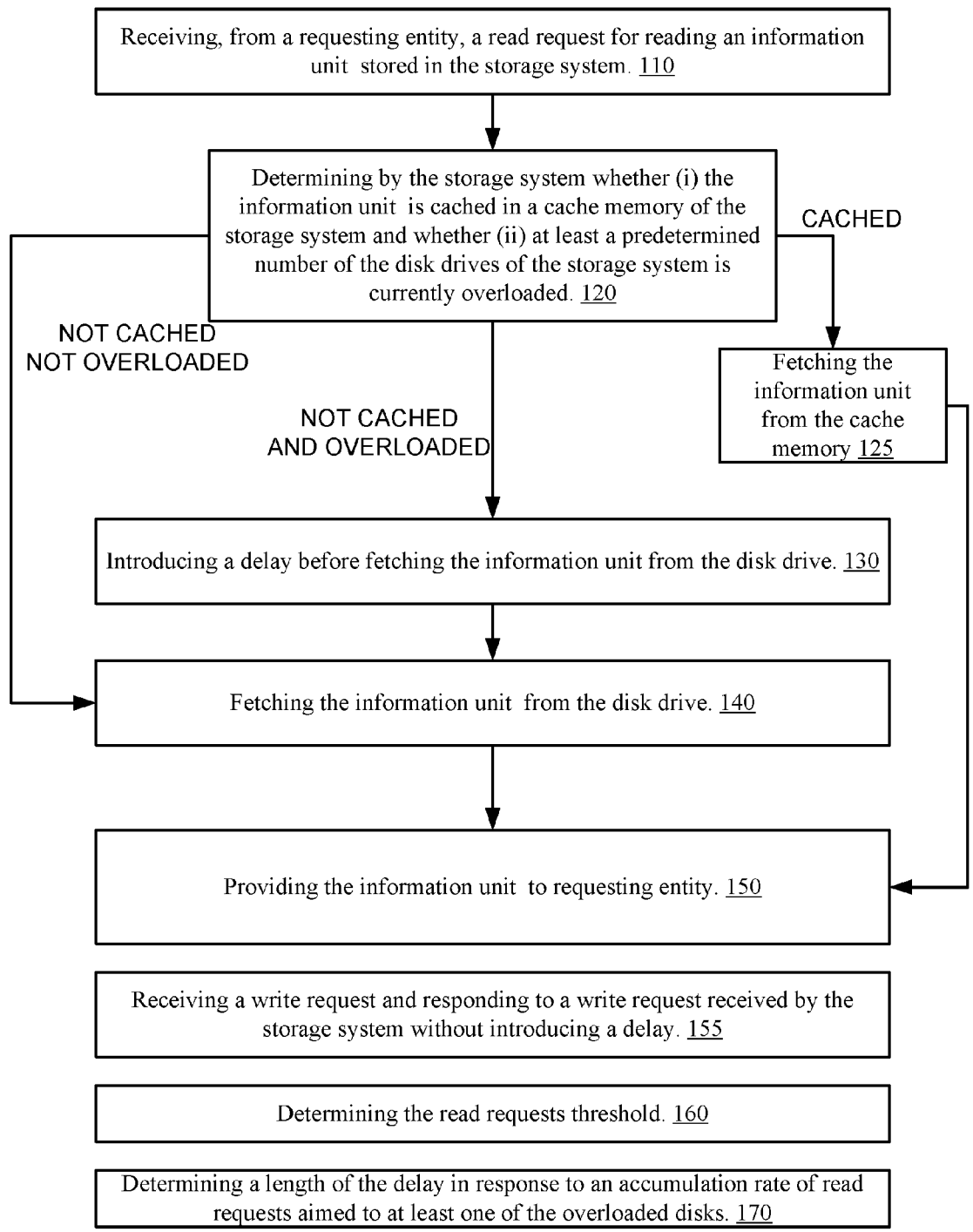
FIG. 3 illustrates a method according to an embodiment of the invention.

FIG. 3 illustrates method 100 according to an embodiment of the invention.

Method 100 may start by stage 110 of receiving a read request for reading an information unit stored in the storage system. The read request can be sent from a requesting entity such as a host computer, an application layer of the storage system, or an application. The application may be hosted by the host computer or the application layer.

Stage 110 may be followed by stage 120 of determining by the storage system whether (i) the information unit is cached in a cache module of the storage system and whether (ii) at least a predetermined number of disk drives of the storage system is overloaded.

If the information unit is not cached in the storage system and the at least predetermined number of disk drives of the storage system are overloaded then stage 120 is followed by stage 130. If the information unit is cashed then stage 120 is followed by stage 125.

If the information unit is not cached and a number of overloaded disk drives does not exceed the predetermined number of disk drives then stage 120 is followed by stage 140.

Stage 120 may include determining that a disk drive is overloaded by comparing a number of pending read requests aimed to the disk drive to a read requests threshold. Alternatively, checking the status of read queues and determining whether the corresponding disk drives are overloaded can be performed by a separate background process that sets or reset an overload status (e.g. a flag indicating whether or not an overload status exists and read throttling is required). Stage 120 may check the overload status managed by the background process and the determining that at least a predetermined number of disk drives of the storage system are overloaded includes checking whether the overload status is set.

Stage 120 may include trying to read the information unit from the cache and either getting a "cache miss" or a "cache hit".

Stage 125 may include fetching the information unit from the cache memory. Stage 125 may be followed by stage 150.

Stage 130 includes introducing a delay before fetching the information unit from the disk drive.

Stage 140 includes fetching the information unit from the disk drive.

Stage 130 and 140 may be followed by stage 150 of providing the information unit to the requesting entity. This may include outputting the response to the read request by the storage system or by the control layer of the storage system.

Method 100 may include stage 155 of receiving a write request and responding to a write request without introducing a delay.

Method 100 may include stage 160 of determining the read requests threshold. Stage 160 may include determining the read requests threshold in response to an average number of actual or expected read requests per disk drive of the storage system. The read request threshold can be a product of a multiplication of the average number or actual number of read requests per disk drive, and the like.

Stage 120 may include determining that a certain disk drive is overloaded in response to a comparison between a rate of emptying (dequeuing) read requests related to the disk drive and a rate of read request enqueueing (filling rate) aimed to that disk drive. If, for example, the rate of the emptying (dequeuing) of read requests gradually decreases in relation to the rate of reception (filling) of the read requests it is expected then the load of the disk drive will increase. If it is determined that the read request accumulation rate increases over time (read queues become more loaded over time) the method may try to reduce the accumulation rate by introducing longer delays and, additionally or alternatively, by lowering the threshold (read requests threshold) that once exceeded causes a disk drive to be regarded as overloaded—and trigger the introduction of delay at earlier stages of the read request accumulation.

Method 100 may also include stage 170 of determining a length of the delay in response to an accumulation rate of read requests aimed to a disk drive.

Stage 170 may include determining a length of the delay so as to guarantee that a time difference between the time of the receiving of the read request and the time of a provision of the information unit to the host computer does not exceed a desired response time.

According to an embodiment of the invention the method can differentiate between read requests aimed to overloaded disk drives and to non-overloaded disk drives. For example the introduction of an intentional delay and the length of the intentional delay may differ from read requests aimed to overloaded disk drives and to read requests aimed to non-overloaded disk drives. The intentional delay may be smaller if the read request is aimed to an overloaded disk drive. The delay may not be introduced if aimed to an already overloaded disk drive.

Figure 4:
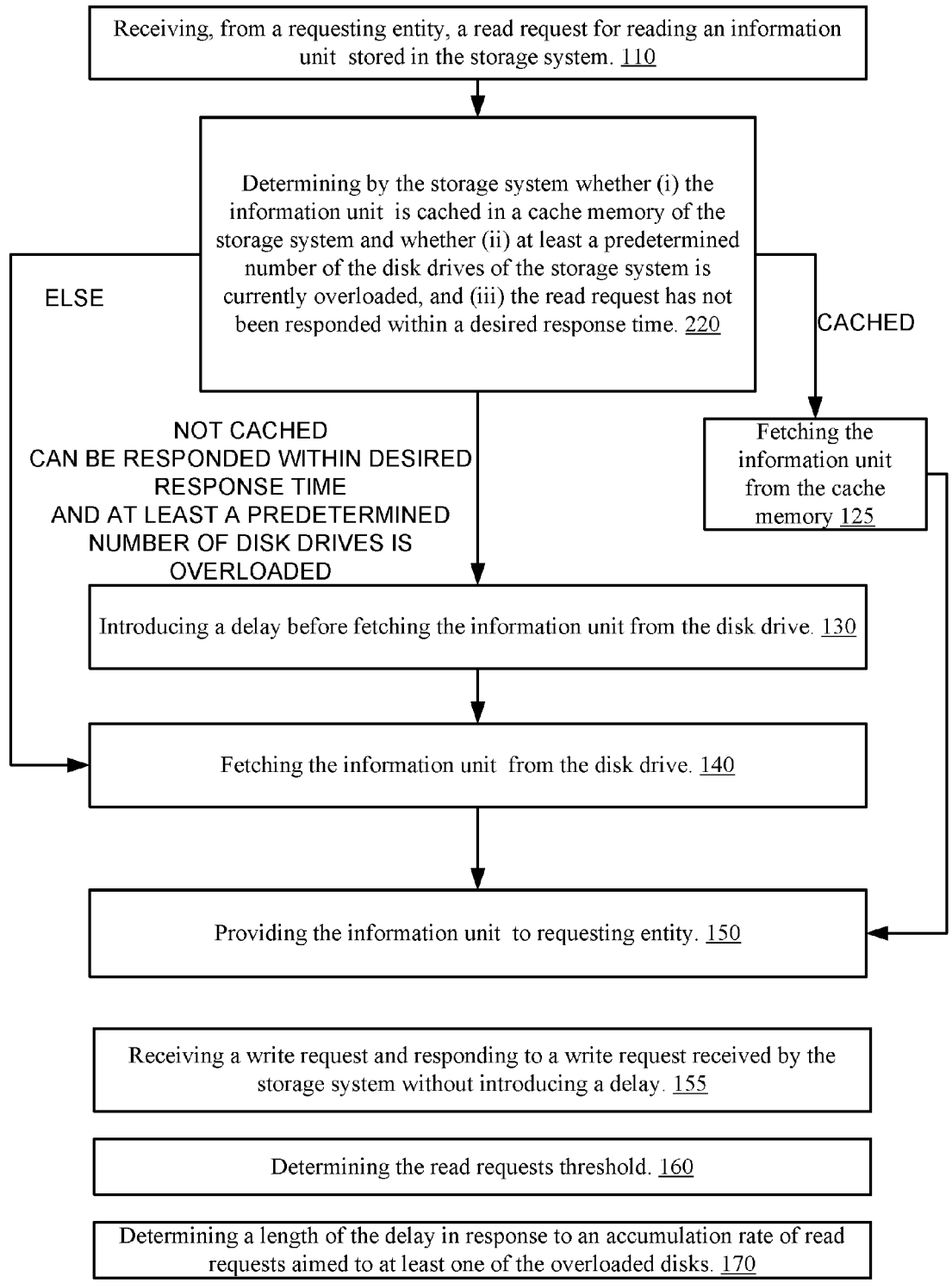
FIG. 4 illustrates a method according to an embodiment of the invention.

FIG. 4 illustrates method 200 according to an embodiment of the invention.

Method 200 may start by stage 110 of receiving, by a storage system and from a host computer, a read request for reading an information unit stored in the storage system.

Stage 110 may be followed by stage 220 of determining by the storage system whether (i) the information unit is cached in a cache module of the storage system, whether (ii) at least a predetermined number of disk drives of the storage system are overloaded, and whether (iii) the read request has not been responded within a desired response time.

If the information unit is cached then stage 220 is followed by stage 125 of retrieving the information unit from the cache memory. Stage 125 may be followed by stage 150.

If the information unit is not cached in the storage system, at least a predetermined number of disk drives of the storage system is overloaded and the read request is responded within the desired response time then stage 220 is followed by stage 130, else (assuming that is it not cached) stage 220 is followed by stage 140.

Stage 130 includes introducing a delay before fetching the information unit from the disk drive.

Stage 140 includes fetching the information unit from a disk drive that stored the information unit.

Stage 130 and 140 may be followed by stage 150 of providing the information unit to the host computer.

Method 200 may include stages 155, 160 and 170.

Figure 5:
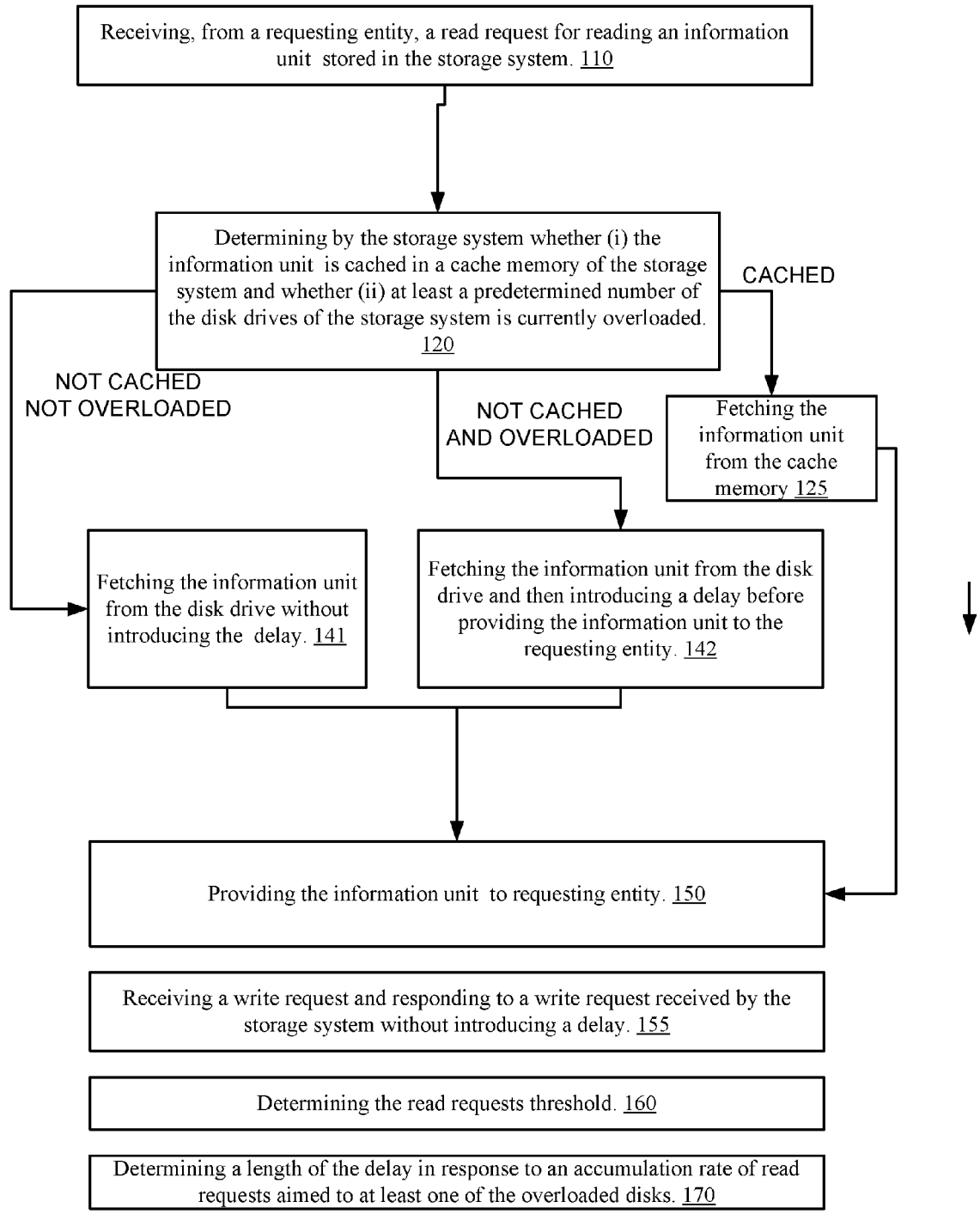
FIG. 5 illustrates a method according to an embodiment of the invention.

FIG. 5 illustrates method 102 according to an embodiment of the invention. Method 102 of FIG. 5 differs from method 100 of FIG. 3 by introducing the delay after fetching the information unit from the disk drive (stage 141 and 142 replaced stages 130 and 140) and before providing the information unit to the requesting entity. The introducing of the delay is performed only if it is determined that that the response from the disk drive is provided within a desired response time. If the response has not been provided by the disk drive within a desired response time (i.e., the response is already delayed more than desired or expected), the method includes preventing introducing the delay.

Accordingly, stages 130 and 142 can be reviewed as examples of a stage of introducing a delay to a response to the read request thereby increasing a time difference between a time of the receiving of the read request and a time of a provision of the information unit to the requesting entity.

The time between the receiving the read request and the time of the provision of the information unit is regarded as a response period to the read request. The time of the providing of the information unit may be the time in which the information unit is provided to the application layer, to a network, to a host computer, to an application, and can be a time of the reception of the information unit by a requesting entity.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for managing read requests, the method comprises:
    receiving from a requesting entity a read request for reading an information unit stored in a storage system;
    determining by a control entity of the storage system whether the information unit is cached in a cache memory of the storage system and whether at least a predetermined number of disk drives of the storage system are currently overloaded;
    introducing a delay to a response to the read request thereby increasing a time difference between a time of the receiving of the read request and a time of a provision of the information unit to the requesting entity, if it is determined that the information unit is not cached in the cache memory and that the at least predetermined number of disk drives of the storage system are currently overloaded; and
    providing the information unit to the requesting entity.

2. The method according to claim 1, comprising introducing the delay after the information unit was provided by a disk drive of the storage system.

3. The method according to claim 1, comprising introducing the delay before sending to a disk drive of the storage system a request to retrieve the information unit.

4. The method according to claim 1, comprising responding to a write request received by the storage system without introducing the delay.

5. The method according to claim 1, comprising responding to a read request without introducing the delay if it determined that the information unit is stored in the cache memory.

6. The method according to claim 1, comprising determining that a disk drive of the storage system is overloaded by comparing a number of pending read requests aimed to the disk drive to a read requests threshold.

7. The method according to claim 6, comprising determining the read requests threshold in response to an average number of actual or expected read requests per disk drive of the storage system.

8. The method according to claim 1, further comprising determining whether the response to the read request has not been provided by a disk drive within a desired response time and preventing from introducing the delay if it is determined that the read request has not been responded within the desired response time; wherein the desired response time is counted from the time of the receiving of the read request.

9. The method according to claim 1, comprising determining a length of the delay in response to an accumulation rate of read requests aimed to any overloaded disk drive.

10. The method according to claim 1, comprising determining a length of the delay so as to guarantee that a time difference between the time of the receiving of the read request and the time of a provision of the information unit to the requesting entity does not exceed a desired response time.

11. The method according to claim 1, comprising determining that the disk drive is overloaded by tracking a difference between a rate of dequeuing read requests from a read request queue of the disk drive and a rate of enqueueing of read requests at the read request queue of the disk drive.

12. The method according to claim 1, comprising introducing the delay to the response to the read request if the disk drive that stores the information unit is not overloaded and not introducing the delay if the information unit is stored in an overloaded disk drive.

13. A non-transitory computer readable medium that stores instructions to be executed by a computer for:
    receiving from a requesting entity a read request for reading an information unit stored in the storage system;
    determining by a control entity of a storage system whether the information unit is cached in a cache memory of the storage system and whether at least predetermined number of disk drives of the storage system is currently overloaded;
    introducing a delay to a response to the read request thereby increasing a time difference between a time of the receiving of the read request and a time of a provision of the information unit to the application if it is determined that the information unit is not cached in the storage system and that the at least predetermined number of disk drives storage system is currently overloaded; and providing the information unit to the requesting entity.

14. The non-transitory computer readable medium according to claim 13, that stores instructions to be executed by a computer for responding to a write request received by the storage system without introducing the delay.

15. The non-transitory computer readable medium according to claim 13, that stores instructions to be executed by a computer for responding to a read request without introducing the delay if it determined that the information unit is stored in the cache memory.

16. The non-transitory computer readable medium according to claim 13, that stores instructions to be executed by a computer for determining that a disk drive of the storage system is overloaded by comparing a number of pending read requests aimed to the disk drive to a read requests threshold.

17. The non-transitory computer readable medium according to claim 13, that stores instructions to be executed by a computer for determining whether the response to the read request has not been provided by a disk drive within a desired response time and preventing from introducing the delay if it is determined that the read request has not been responded within the desired response time; wherein the desired response time is counted from the time of the receiving of the read request.

18. The non-transitory computer readable medium according to claim 13, that stores instructions to be executed by a computer for determining a length of the delay in response to an accumulation rate of read requests aimed to any overloaded disk drive.

19. A system comprising:
multiple disk drives;
a cache memory; and
a control entity that is arranged to:
receive from a requesting entity a read request for reading an information unit stored in the storage system;
determine whether the information unit is cached in the cache memory of the storage system and whether at least a predetermined number of disk drives of the multiple disk drives is currently overloaded;
introduce a delay to a response to the read request thereby increasing a time difference between a time of the receiving of the read request and a time of a provision of the information unit to the application if it is determined that the information unit is not cached in the storage system and that the at least the predetermined number of disk drives of the storage system is currently overloaded; and
control a provision of the information unit to the requesting entity.

20. The system according to claim 19, wherein the control entity is arranged to determine whether the response to the read request has not been provided by a disk drive within a desired response time and to prevent introducing the delay if it is determined that the read request has not been responded within the desired response time; wherein the desired response time is counted from the time of the receiving of the read request.

* * * * *